United States Patent [19]
Rirsch et al.

[11] Patent Number: 5,106,557
[45] Date of Patent: Apr. 21, 1992

[54] PROCESS FOR THE PRODUCTION OF CONCRETE BUILDING PRODUCTS

[75] Inventors: Eric Rirsch, Billingshurst; Jeremy Wingfield, Horsham, both of United Kingdom

[73] Assignee: Redland Roof Tiles Limited, Reigate, United Kingdom

[21] Appl. No.: 362,810

[22] Filed: Jun. 7, 1989

[30] Foreign Application Priority Data

Jun. 11, 1988 [GB] United Kingdom ............... 8813894

[51] Int. Cl.⁵ ..................... B28B 11/14; B29C 47/00
[52] U.S. Cl. ..................... 264/118; 264/122; 264/148; 264/157; 264/163; 264/177.11; 264/177.2; 264/211; 264/211.11; 264/333; 264/DIG. 31; 264/DIG. 49
[58] Field of Search ............ 264/148, 157, 211.11, 264/211, 177.11, 177.18, 177.2, 108, 163, 333, 118, 122, DIG. 31, DIG. 49; 106/711, 802, 805

[56] References Cited

U.S. PATENT DOCUMENTS

| | | | |
|---|---|---|---|
| 1,327,721 | 1/1920 | Mattison, Jr. | 264/148 |
| 3,219,467 | 11/1965 | Redican et al. | 264/211.11 X |
| 4,297,309 | 10/1981 | North | 264/148 X |
| 4,305,901 | 12/1981 | Prince et al. | 264/148 X |
| 4,564,485 | 1/1986 | Eschner et al. | 264/211.11 X |
| 4,673,543 | 6/1987 | Akasaka et al. | 264/211.11 X |
| 4,695,189 | 9/1987 | Baker et al. | 264/162 X |
| 4,784,816 | 11/1988 | Sattler | 264/211.11 X |

FOREIGN PATENT DOCUMENTS

| | | | |
|---|---|---|---|
| 59417 | 5/1975 | Japan | 264/211.11 |
| 19581 | 2/1980 | Japan | 264/211.11 |
| 124605 | 9/1980 | Japan | 264/211.11 |
| 85/00135 | 1/1985 | PCT Int'l Appl. | |
| 2195626 | 4/1988 | United Kingdom | |

Primary Examiner—Karen Kutachi-Aftergut
Attorney, Agent, or Firm—Beveridge, DeGrandi & Weilacher

[57] ABSTRACT

The production of concrete building products having thickness in section of not greater than 15 mm includes forming a cementitious composition containing aggregate, hydraulic cement and water. The composition is shaped by a roller and slipper method to produce a shaped extrudate which is then divided into form sections. The sections are then cured to provide the aesthetically pleasing product. The cementitious composition also contains reinforcing fibres. The building products are used for roofing tiles or replacement of shingles, shakes and slates.

27 Claims, 1 Drawing Sheet

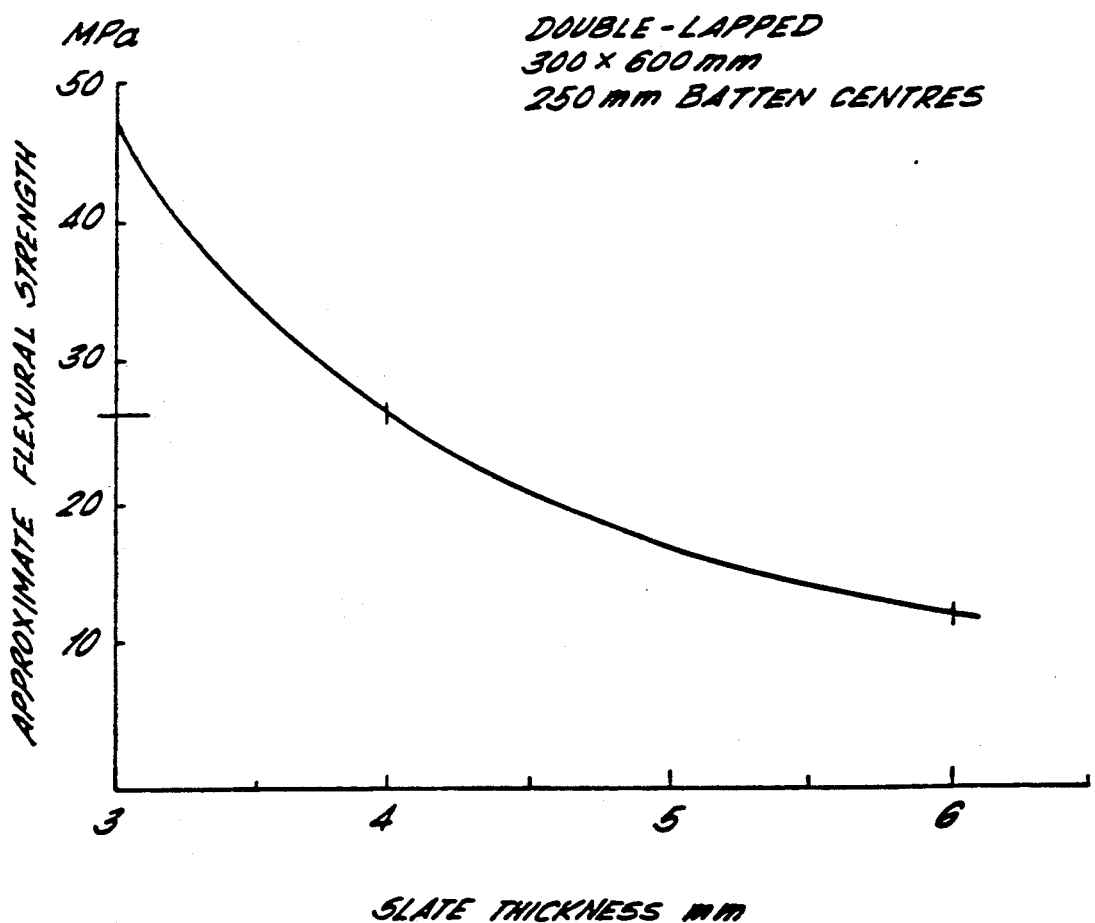

PROCESS FOR THE PRODUCTION OF CONCRETE BUILDING PRODUCTS

This invention relates to the production of fibre-reinforced concrete building products by conventional extrusion processes and is particularly concerned with such a process which provides impact resistant roofing products of a kind which are, for example useful as interlocking roof tiles or as a replacement for shingles, shakes, asbestos cement slates and natural slates.

Such a conventional extrusion process is the roller and slipper method of producing concrete roof tiles. The process is well known and comprises the steps of compressing a mix of cement, aggregate and water on to moving pallets first by means of a roller and then by means of a slipper. The ribbon of tile-forming material thereby obtained is cut into sections of the required length and cured by conventional means. A description of the conventional means which is widely used to make tiles by the aforementioned process can be found in PCT International Publication No. WO 85/00135.

Cement mortars and cement concretes are widely used as cheap building materials. Such cement bonded materials, while being acceptably durable, have the disadvantage of low tensile strength, low flexural strength and low impact strength. For many applications these disadvantages do not present a problem but where it is desirable to reduce product thicknesses or where very thin cross-section products are required, it is desirable to have products of high impact strength and good durability. By good durability is meant good resistance to:

a) variations in climatic conditions, particularly freeze-thaw conditions and cycles of alternative rain and sunshine;

(b) ultra-violet attack;

(c) acid rain; and, (d) abrasion of surfaces by the elements such that the strength of a product is maintained throughout its life.

Products of reduced thickness are required, for instance, where it is necessary to reduce weight-loadings on old previously slated roofs, where the use of concrete roof tiles of conventional thickness is prohibited by increased weight on roof timbers, where it is desirable to reduce material costs by reducing the quantities required or from an aesthetic consideration where thicker products may be less desirable.

Very thin cross-section products are required, for instance, where it is necessary to replace natural slate with a cheaper material or to replace asbestos cement roof slates with a material which does not present a health hazard or to provide durable alternatives to wooden shakes or shingles.

There is thus a need for concrete building products produced by conventional extrusion processes to give impact resistant products of reduced thickness or to give very thin cross-section products of high flexural strength and high impact strength to make possible the use of a relatively cheap material without the health hazards associated with alternative materials for a wide range of applications. For a given material, as thickness is reduced so resistance to impact damage is decreased. This can be compensated for by increasing impact strength per unit thickness.

FIG. 1 illustrates flexural strengths required for formed slates of given thicknesses.

In the field of cementitious compositions it is known to use a variety of polymeric compounds as additives to modify the properties of the cured or uncured product.

In U.S. Pat. No. 3,850,651 the improvement in the mechanical properties and resistance to chemicals obtained by the incorporation in a concrete composition of vinyl polymers or copolymers is disclosed.

In U.K. 2,195,626 A the improvements in flexural strength and durability obtained by the modification of a cementitious composition by a polymer latex is described. By the term "polymer latex" in this and the present specification there is meant small particles of water-insoluble polymeric material which are suspended in aqueous medium. In particular, flexural strengths of at least 25 MPa can be obtained by a 10% polymer addition (solid polymer expressed as a percentage of the weight of the cement) along with marked improvements in durability. The improvements in durability are thought to be achieved by the use of a water-insoluble polymeric material and the combination of low water:cement ratios and good compaction techniques giving the cured material low porosity and in particular very low volumes of pores larger than 100 microns.

In U.K. 2,101,984 B the effect of reducing the water:cement ratio in polymer modified concretes is disclosed as well as using special means to provide good compaction of the cementitious composition. Flexural strengths of 20 to 25 MPa may be obtained when the materials are dry but when saturated or partially saturated with water these materials are reduced in strength.

Many types of polymer latex can be used to bring about the increased strength and durability as disclosed in U.K. 2,195,626 A. Examples of suitable latices include: elastomeric polymers such as natural and synthetic rubber, thermoplastics such as polyacrylic esters, ethylene-vinyl acetate copolymers, polyvinylidene chloride and polyvinyl acetate, thermosetting resins such as epoxy resins.

In general, the impact strength of a product is indicative of its resistance to a suddenly applied load. For roofing products the impact strength can give an indication of how resistant a particular product will be to breakage by nailing, cutting or transit.

It is known that the impact strength of a cementitious product may be improved by including a fibre in the composition. Such fibre-reinforced products are also sometimes acceptably durable, the best known example being asbestos cement.

Fibrous materials which have been used in the past to increase strengths of cementitious products include fibres of asbestos, glass, steel, ceramic, polymer and natural materials. The use of fibres does, however, have certain drawbacks in some cases since in the long term the presence of the fibres may adversely affect the strength of the product because the fibres may suffer degradation due to alkali attack, which, coupled with long-term weathering, may also adversely affect the durability of the finished product. Moreover, depending on the manufacturing route chosen the use of such fibrous materials can add to the difficulty of processing the composition. In general, as the amount or length of fibres increase, the processability of the material is reduced. Furthermore, some fibres, for example asbestos, may involve health hazards due to carcinogenity and/or toxicity of the fibrous material.

The roller and slipper method is one of the conventional routes used in processing cementitious mortars for the production of roof tiles. Incorporation of fibres into these mortars has been explored in the past and found to be unsuccessful resulting in inconsistent feeding and incomplete tiles.

Due to this difficulty, other more elaborate methods have been investigated previously such as that described in UK 2,108,897B where vibrating casting has been found to be necessary to produce fibre reinforced cementitious material. Furthermore, there are no fibre-reinforced products currently produced by the roller and slipper method.

A first embodiment of the present invention has the aim of providing reduced weight loading, impact resistant products having low susceptibility to water and good durability from hydraulic cement concretes and mortars modified by the addition of fibre reinforcement, said products being produced by the roller and slipper method.

A second embodiment of the present invention has the aim of providing very thin products having high flexural strength, high impact strength, low susceptibility to water and good durability from hydraulic cement concretes and mortars modified by the addition of a polymer latex and fibre reinforcement, said products being produced by the roller and slipper method.

Accordingly, a first aspect of the present invention provides a process for the production of concrete building products having thicknesses in section of not greater than 15 mm in which a cementitious composition comprising (i) aggregate, (ii) a hydraulic cement and (iii) water is shaped by a roller and slipper method to produce a shaped extrudate which is divided to form sections and the sections are cured to provide the building product; the composition additionally comprising reinforcing fibres in weight percent to the total weight of the composition of 0.25% to 4%, said fibres having lengths of 0.5 mm to 20 mm.

By controlling fibre within a given range of dimensions it is advantageously possible to formulate materials processible by the conventional technique of roller and slipper extrusion. Processibility, can, although not essentially be, further assisted by the incorporation of, for example, superplasticisers or polymer latices which increase the processibility of formulations by reducing the shear force necessary for the material to flow. Furthermore, by using higher fractions of cement in the formulation, it is possible to increase the volume of fibres in the mix and still retain processibility.

Another advantage of the process of the present invention lies in the production of flat roofing slates to be used as a replacement for natural slates. These slates are typically 600 mm long and 300 mm wide and can be produced using the roller and slipper extrusion process by extruding 300 mm wide and cutting to 600 mm length. A benefit of the roller and slipper process is that the fibres and slate particles are aligned parallel to the extrusion direction thereby introducing an anisotropy in properties. This gives particular benefits in preventing cracking during fixing and enables relatively large distances to be spanned such as those between roof battens.

A second aspect of the present invention provides a process for the production of concrete building products in which a cementitious composition comprising (i) aggregate, (ii) a hydraulic cement, and (iii) water is shaped by a roller and slipper method to produce a shaped extrudate which is divided to form sections and the sections are cured to provide the building product; the composition additionally comprising a polymer latex in weight ratio of polymer latex (calculated as dry weight) to cementitious material of 5:100 to 50:100 and reinforcing fibres in weight percent to the total weight of the composition of 0.25% to 4%, said fibres having lengths of 2.0 mm to 20 mm.

Preferably the composition additionally comprises a plasticiser or a superplasticiser.

Preferably, the polymer latex is present in weight ratio of polymer to cementitious material of 7:100 to 15:100. More preferably, the composition comprises polymer latex present in weight ratio of polymer to cementitious material of about 12.5:100.

Preferably, the composition comprises reinforcing fibres of 0.25 to 1 weight % of fibres based on the total weight of the composition. More preferably, the fibres have lengths of 4 mm to 8 mm.

More preferably, the composition comprises 0.5 weight % reinforcing fibres based on the total weight of the composition, of substantially 6 mm length.

The fibres are preferably polypropylene fibres and the composition preferably comprises from 1 to 30% silica fume calculated as a percentage of the weight of cementitious material in the composition.

The composition may be cured using an autoclave.

The advantages of autoclaving include the possibility of reduction in curing time and also improvements in strength. For example, it has been shown in "The Effects of Activated Silica on the Mechanical Properties of Concrete Submitted to High Temperature Curing", by S. Nagataki, Cement and Concrete (Japan) N0387, May 1979, that autoclaving a Portland cement—silica fume—superplasticiser material gives improvements in strength over normal heat curing.

According to a further feature of the present invention there are provided extrusion moulded sections made of concretes or mortars modified as hereinbefore described by means of fibre reinforcement and having transverse impact strength values in excess of 1.5 $KJm^{-2}$.

According to a further feature of the present invention there are provided extrusion moulded sections made of concretes or mortars modified as hereinbefore described by means of a polymer latex and a fibre reinforcement and having MOR (Modulus of Rupture) values in excess of 20 MPa and impact strength values in excess of 1.6 $KJm^{-2}$.

The moulded articles according to the second aspect of the present invention preferably have a cross-section of 12 mm or less and especially 6 mm or less. The process according to the present invention makes possible the production of fibre reinforced cement concrete or cement mortar roof tiles, particularly concrete tiles of reduced thickness, and concrete slates as replacements for asbestos cement slates or natural slates. Advantageously, the products produced by the process according to the present invention have an aesthetically pleasing surface finish resembling that of a given natural slate. Other uses for the concrete products of improved strength and durability obtainable by the process according to the invention are as flooring tiles, cladding panels, sheeting and extruded piping, and extruded boards.

Compositions for use in the production of fibre-reinforced concretes and mortars include the following ingredients:

(i) Aggregate

Aggregates are conveniently provided by slate or sand or mixtures thereof. The preferred ratios of aggregate: cement by weight lie in the range 0.5:1 to 4:1. In general, preferred compositions have an aggregate:cement ratio of 1.5:1. For example they may comprise coarse slate and fine sand. Generally coarse slate or sand can be defined as comprising particles of which not more than 10% by weight have a size of less than 200 microns. Fine slate or sand generally has more than 90% by weight of its particles having a size of less than 300 microns. The coarse slate may be supplied by Delabole Slate Quarries, Cornwall, England, or Redland Aggregates, Blaenau Ffestiniog, Wales and a useful material for the products of this invention is type S12 containing the following fractions:

|   | Size (microns) | % by weight |
|---|---|---|
| A | 2360 | 0.1 |
| B | 1180 | 9.0 |
| C | 600 | 61.1 |
| D | 300 | 26.3 |
| E | 150 | 1.3 |
| F | 75 | 0.3 |
| G | 53 | 0.6 |
| H | Less than 53 | 1.3 |

The aggregate may also comprise a low density aggregate such as vermiculite, perlite, hollow glass spheres and natural lightweight aggregate. This would have the advantage of reducing the weight of the product and in the case of a roofing slate this would reduce the load on the roof structure.

A suitable fine sand is supplied by David Ball of Cambridge, England, and contains the following fractions:

|   | Size | % by weight |
|---|---|---|
| I | 300 microns–150 microns | 50% |
| J | 150 microns–90 microns | 25% |
| K | Less than 90 microns | 25% |

Other fine sands are available, such as Wrotham 75 supplied by Buckland Sand and Silica Co., Reigate, Surrey.

A preferred slate with fine sand mixture contains 60% of type S12 course slate and a fine sand mixture 20% I, 10% J and 10% K.

(ii) Cement

The cement used in the compositions are conveniently hydraulic cements, i.e. those which set and harden by the addition of water, that is in the presence of water. The cement may be a silicate cement such as Portland Cement or Rapid Hardening Portland Cement or it may be an aluminate cement. The compositions may include mixtures of different hydraulic cements.

The cementitious composition may comprise blast furnace slag, pulverised fuel ash or silica fume. In particular, it is preferred to include from 1 to 30% of silica fume, calculated as a percentage on the weight of cementitious material in the composition, since it has the effect of reducing porosity and increasing the strength of the cured product. More preferably, the composition contains from 5 to 15% silica fume. In all calculations the weight of cement or cementitious material includes the weight of the silica fume.

The silica fume preferably contains the following fractions:

|   | Size | % by weight |
|---|---|---|
| A | Less than 0.05 microns | 20 |
| B | Less than 0.10 microns | 70 |
| C | Less than 0.20 microns | 95 |
| D | Less than 0.50 microns | 99 |

(iii) Water

A weight ratio of water:cementitious material of 0.15 to 0.40 is usually preferred and advantageously the weight ratio of water to cement and/or cementitious material is just sufficient to provide adequate workability of the mix. Where a polymer latex is added to the cementitious material the weight ratio of water:cementitious material of 0.12:1 to 0.25:1 is preferred. The water includes that from any latex and plasticiser present and the binder includes both the cement (C) and silica fume (SiF) where it is added. A measurement of the total amount of water in a particular formulation is given as the W/(C+SiF) ratio. That is the ratio of the total water content to the total binder content.

(iv) Fibres

As referred to above, many types of fibre have been previously used to add reinforcement to cement and/or concrete compositions.

Various fibre types may be used in compositions according to the present invention including polypropylene fibres, polyvinylalcohol fibres, polyacrylonitrile fibres, jute, E-glass fibres and cellulose fibres. Various fibre types and their important properties are listed in Table 1 below.

TABLE 1

FIBRE PROPERTIES

Examples used in Formulations

| Type | Density (g/cm³) | Name | Length (mm) | Diameter (μm) | Elastic Modulus GPa |
|---|---|---|---|---|---|
| Polypropylene (fibrillated) | 0.92 | Krenit Rein | 2.5–10 | 140–220 | 15 |
|  |  | Fibermesh | 6 | 300 | 15 |
| Polypropylene (monofilament) | 0.92 | PFE (crimped) | 10 | 50 | 5 |
|  |  | Crackstop | 6–12 | 20 | 5 |
| Polyvinylalcohol | 1.3 | Kuralon RM182 | 6 | 15 | 35 |
|  |  | Kuralon RMS182 | 6 | 20 | 30 |
|  |  | Mewlon | 6–12 | 20 | 20 |
| Polyacrylonitrile | 1.15 | Sekril 110 | 6 | 15 | 13 |
|  |  | Sekril 900 | 6 | 35 | 7 |
|  |  | Courtelle SP/15 (crimped) | 20 | 15 | 7 |
|  |  | Ricem | 6 | 15 | 5 |
|  |  | Dolanit | 6 | 55 | 16 |
| Polyester | 1.2 | Nurlon | 20 | 35 | 17 |
| E Glass | 2.5 | Chopped Strands | 5 | 15 | 75 |

TABLE 1-continued

FIBRE PROPERTIES
Examples used in Formulations

| Type | Density (g/cm³) | Name | Length (mm) | Diameter (μm) | Elastic Modulus GPa) |
|---|---|---|---|---|---|
| Jute | 1.2 | Taytec | 5 | 60 | 30 |
| Cellulose | 1.2 | Kraft Board | 1 | 30 | 30 |
|  |  | Custom | 1 | 20 | 30 |
| Ceramic | 2.7 | Fiberfrax | 0.5-10 | 2 | 95 |

KRENIT and CRACKSTOP are supplied by FIBROMIX LIMITED of Clifton, Derbyshire, England.

CUSTOM is supplied by BOUD MARKETING LIMITED of Laddington, England.

FIBERMESH is supplied by FIBERMESH (EUROPE) LIMITED of Chesterfield, England.

NURLON is supplied by SMITH CHEMICAL CORPORATION of Ohio, United States of America.

FIBERFRAX is supplied by CARBORUNDUM RESISTANT MATERIALS LIMITED of St. Helens, England.

DOLANIT is supplied by HOECHST UK LIMITED of Hounslow, England.

KURALON is supplied by MITSUBISHI CORPORATION of London, England.

MEWLON is supplied by UNITIKA KASEI LIMITED of Osaka, Japan.

SEKRIL and COURTELLE are supplied by COURTAULDS FIBRES LIMITED of Coventry, England.

PFE is supplied by POLYMER FIBRE ENGINEERING of England.

RICEM is supplied by MONTEFIBRE UK LIMITED of Bradford, England.

TAYTEC is supplied by CROXTON & GARRY LIMITED of Dorking, England.

E-GLASS is supplied by FIBREGLASS LIMITED of St. Helens, England.

KRAFT is supplied by BUNZL PULP & PAPER LIMITED of London, England.

As previously mentioned, in the past it has not been possible to process fibre-reinforced compositions by conventional extrusion processes. Surprisingly, it has been discovered that it is possible to process certain of the fibres listed in Table 1. In particular, good processability of a cementitious composition is obtained with fibres of polypropylene, polyvinylalcohol, polyacrylonitrile, and E-Glass. More particularly, even better processability of a cementitious composition is obtained with polypropylene fibres of the type KRENIT which are supplied as 38,000 denier fibrillated fibres. Such fibrillated fibres, with fibre diameters of around 200 microns, can be more readily incorporated into the compositions than the much finer monofilament fibres because the water demand of the formulation is reduced. During fibrillation, which is a mechanical process, fibres are produced with interconnecting strands and a rough surface which form a good mechanical bond with the cement matrix unlike monofilament fibres. An advantage of fine monofilament fibres over the thicker fibrillated type is that a smoother product is obtained as the fibrillated fibres tend to protrude from the extruded material.

The amount of fibres incorporated into the different compositions are expressed in terms of the percentage by weight of the total. The amount of fibres can also be expressed as a percentage by volume of the total and this will depend on the density of the whole composition and the specific gravity of the fibre. In the examples given the KRENIT polypropylene fibres with a weight percent loading of 0.5% would be equivalent to a volume percent loading of 1.1% where the specific gravity of polypropylene is 0.92g/cm³. A weight percent loading of 0.5% of SEKRIL 110 fibres, which have a specific gravity of 1.18g/cm, would be equivalent to a volume percent loading of 0.9%.

Preferably the percentage by weight of fibres in the composition is less than 2% and more preferably 0.4 to 0.6 e.g. about 0.5%. Compositions containing more than 4% by weight of fibres were found to be difficult to process by the roller and slipper method.

Preferably the length of the fibres in the composition is less than 10 mm and more preferably is 3 to 7, e.g. 5 mm. Compositions containing fibres longer than 20 mm were found to have a somewhat "hairy" appearance influencing the aesthetic appeal of the cured product. Cutting problems were also experienced with compositions containing fibres longer than 20 mm.

(v) Additives

Conveniently, to aid homogeneous dispersion of the various components of the composition and to give an easily processable mix a polymer latex as used in UK 2,195,626A and/or a plasticiser such as CORMIX P1 or a superplasticiser such as CORMIX SP2 both supplied by Cormix Ltd., of Cheshire, England, may be added to the composition. CORMIX P1 plasticiser is a liquid lignosulphonate plasticiser supplied at 25% aqueous solution. CORMIX SP2 superplasticiser is a melamine formaldehyde sulphonate at 28% solids formed by the condensation reaction and subsequent sulphonation of melamine and formaldehyde.

It is believed that both superplasticisers and polymer latices, primarily function by aiding dispersion of the components of the cementitious composition. By dispersing agglomerates of particles these additives reduce the viscosity of the formulation, which enables the quantity of added water to be reduced and the strength of the cured cement matrix to be correspondingly increased. When a polymer latex is present in the composition, a further increase in strength may be obtained by a contribution to the composite from the strength of the coalesced polymer particles. The coalesced polymer latex may also reduce water uptake of the cured product.

A further function of these additives in the case of the present invention, is to assist in processing the fibrous mortars by the roller and slipper technique by modifying viscometric properties.

When mixing superplasticised cement formulations it is advantageous to delay the addition of the plasticiser until all the water had been added. This time delay can advantageously be from several seconds to up to 10 minutes. When the addition of plasticiser is delayed it is found that less water is needed in order to achieve the same mix consistency than if the water and plasticiser were added together. This reduction in the overall water content can lead to higher flexural strengths, which are known to be related to water content.

Conveniently, to reduce unnecessary or unwanted air entrainment into the composition during processing, an anti-foaming agent such as BEVALOID 691, BEVALOID 770 DD or BEVALOID 581B supplied by Bevaloid Limited, Beverly, Yorkshire, England may be added.

The composition may be used to make products having a thickness in section in the range 2 or 3 mm to 15 mm. For example, the material may be used to make a concrete roof tile of maximum thickness 15 mm and weight loading 22.5 kgm$^{-2}$ having a transverse impact strength of 1.6 KJm$^{-2}$ as an alternative to a concrete tile of maximum thickness 26 mm and weight loading 51.2 Kgm$^{-2}$ having a transverse impact strength of 0.9 KJm$^{-2}$. The material may also be used to make a concrete slate of high flexural strength, with MOR values in excess of 20 MPa, and high transverse impact strength with values in excess of 1.6 KJm$^{-2}$ as a replacement for asbestos cement roof slates or natural slates.

In practice, it has been found that as a general rule flexural strengths as illustrated in the accompanying FIG. 1 are required for products made from the material to be suitable as replacement slates of a given thickness. For example, for a slate of thickness 6 mm an approximate minimum flexural strength of 12 MPa is required and for a slate of thickness 4 mm an approximate minimum flexural strength of 26 MPa is required.

The invention will now be illustrated by way of example.

Examples 1 to 3 illustrate the first aspect of the invention. In these three examples, flexural strengths were measured by three-point bending using the formula:

$$S = \frac{3Wl}{bd^2}$$

where $S$ = flexural strength
$W$ = breaking load
$l$ = span between supports and centre loading point
$b$ = width
$d$ = thickness Impact strengths were measured transverely to the extrusion direction and in some cases parallel to the extrusion direction by a Zwick Charpy impact tester on samples 100 mm × 10 mm × 10 mm or as close to this as possible. A test span of 70 mm was used with a 0.5 J hammer.

The cementitious compositions were prepared by mixing the dry components in a Cretangle multiflow mixer for 2 minutes followed by addition of the liquid components (water, anti-foaming agent and superplasticiser). The compositions were mixed for a further 3 minutes. The fibres were then added and the compositions mixed for a further 3 minutes.

The compositions were then subjected to extrusion by the roller and slipper method on a laboratory scale tile machine to give green products with thicknesses of between 8 mm and 10 mm.

The green products were than cured in a curing chamber at 50° C. and 100% relative humidity for 24 hours.

EXAMPLES 1 TO 3

Formulation 360 g Delabole S12 slate
240 g David Ball Sand
360 g Cement OPC
40 g Silica fume (Microsilica)
10.5 g Pigment
16 g Superplasticiser (Cormix SP2)

Where present the fibre reinforcement was provided by KRENIT polypropylene fibres. Example 1 used 112 g of water, Example 2 used 96 g of water and Example 3 used 88 g of water. The results are given in the following Table 2.

TABLE 2

| Example | A/C+ | W/C+ | Transverse Flexural Strength MPa | Transverse Impact Strength KJm$^{-2}$ | Fibre Weight % | Fibre Length mm |
|---|---|---|---|---|---|---|
| 1 | 1.5 | 0.31 | 13.2 ± 0.7 | 1.7 ± 0.4 | 0.5 | 5 |
| 2 | 1.5 | 0.27 | 15.1 ± 1.7 | 1.5 ± 0.2 | 0.5 | 5 |
| 3 | 1.5 | 0.25 | 16.5 ± 1.8 | 1.2 ± 0.1 | 0.0 | — |

A/C = Aggregate to (cement + Silica fume) ratio
W/C = Water to (cement + Silica fume) ratio The flexural strength measurements were made after 7 days at ambient laboratory conditions post cure followed by a 1 day water immersion.

Compositions for use in the production of polymer modified fibre—reinforced concretes and mortars include the following ingredients as hereinbefore defined aggregates: cement, fibres, additives and water excepting that the weight ratio of water:cement is within the range of 0.12–0.25 and advantageously is just sufficient to provide adequate workability and the compositions additionally include the polymer which serves to provide the useful extra properties relative to similar compositions but which contain no polymer.

The polymer may be used in the form of a polymer latex as hereinbefore defined or may be a thermosetting resin such as an alkali soluble phenolic resol.

As referred to above, many types of polymer latex can be used to bring about the increased strength and durability in practising the present invention.

Preferred latices for use in the invention are vinyl chloride/vinyl acetate/ethylene terpolymers such as the Wacker Chemie product VINNOL CE35, and copolymers of alkyl methacrylate or acrylate and methacrylic or acrylic acid such as PRIMAL B-60A or PRIMAL E-357 supplied by Rohm and Haas Ltd. of Croydon, Surrey, England. Styrene acrylic copolymers such as LDM 6880 and ADH 3146 supplied by Harco of Harlow, Essex, England, may also be used.

The following examples 4 to 15 use a polymer latex and illustrate the second aspect of the invention. In these examples flexural strength and impact strength were determined as before.

The compositions were prepared by mixing the dry components in a Cretangle multiflow mixer for 2 minutes followed by the addition of the liquid components, namely polymer latex, anti-foaming agent, plasticiser and additional water. The compositions were mixed for a further 3 minutes. The fibres were also added at this stage followed by a further 3 minutes mixing. The compositions were than subjected to extrusion by the roller and slipper method on a laboratory scale tile machine to give green products with thicknesses of between 8 and 12 mm.

The green products were then cured by means of a two-stage curing process in which the first stage comprised placing the products in a high humidity chamber with humidities of 80% or more at a temperature of 50° C. until curing of the cement component of the composition was complete (usually 12 to 15 hours) and the second stage comprised placing the hardened products in a drying oven at 70° C. and less than 50% humidity for 24 hours.

EXAMPLES 4 TO 15

Formulation

| | |
|---|---|
| 360 g | Delabole S12 slate |
| 240 g | David Ball Sand |
| 360 g | OPC cement |
| 40 g | Silica fume |
| 107 g | Polymer latex |
| 16 g | Water |
| 1 g | Anti-foaming agent, (BEVALOID 691) |
| 10 g | Pigment |
| 8 g | Plasticiser (CORMIX P1) |

Where present the fibre reinforcement was provided by KRENIT polypropylene fibres. Examples 7, 13, 14 and 15 contained the same formulation as mentioned above excepting that the silica fume was omitted. The results are given in Table 3.

Examples 4, 5, 6, 7 and 8 illustrate the effect of fibres on impact strength and flexural strength.

A comparison of examples 9, 10, 11 and 12 shows the effect of increasing fibre length on processability and impact strength.

A comparison of Examples 13, 14 and 15 shows the effect of increasing the weight of fibres on processability and impact strength.

Examples 16 and 17 further illustrate the second aspect of the invention. In these examples flexural strengths were measured both transverse and parallel to the extrusion direction by the three-point bending method as hereinbefore described. Impact strength measurements were made by Zwick Charpy impact tester on samples 100 mm × 10 mm × 6 mm or as close to this as possible. A test span of 70 mm was used with a 0.5 J.

The composition was prepared as described for examples 4 to 15. The composition was then subjected to extrusion by the roller and slipper method on a production scale tile machine to give green products with thicknesses of between 4 and 6 mm.

The green products were then cured following the regime described for examples 4 to 15.

EXAMPLES 16 AND 17

Formulation 360 g Delabole S12 slate
240 g David Ball Sand
360 g Rapid Hardening Portland Cement
40 g Silica fume
106 g Polymer latex E357
1 g Anti-foaming agent, BEVALOID 691
10 g Pigment
8 g Plasticiser, CORMIX P1
6 g KRENIT, Polypropylene fibres, 5 mm length Example 16 contained 15 g of additional water, while Example 15 contained 19 g of additional water. The results are given in Table 4.

EXAMPLES 18 AND 19

Formulation 360 g Slate
240 g Silica Sand
360 g Rapid Hardening Portland Cement
40 g Microsilica
10.4 g Pigment
24 g Superplasticiser, CORMIX SP2
5.2 g KRENIT Polypropylene fibres, 6 mm length Examples 18 and 19 show the effect of increasing the level of superplasticiser in the formulations so that the overall amount of water can be reduced. When used in conjunction with the delayed addition of plasticiser good flexural strengths can be obtained. Example 18 contained 88 g of water and example 19 contained 72 g of water in the above formulation. The results are given in Table 5.

The samples were cured for 24 hours at 50° C. and 100% relative humidity then tested for flexural strength after 28 days at ambient laboratory conditions.

Example 16, 17, 18 and 19 also show the effect of anisotropy on impact strength where samples tested in the direction parallel to extrusion have greater impact strengths than those in the transverse direction.

TABLE 3

| Example | Polymer Latex | W/(C + SiF) | Silica fume % of binder | Fibre weight % | Fibre Length mm | Transverse Impact KJm$^{-2}$ | Transverse Flexural Strength MPa | | Processability |
|---|---|---|---|---|---|---|---|---|---|
| | | | | | | | Dry | 7 day Immersion | |
| 4 | CE35 | 0.18 | 10 | — | — | 1.4 | 25.9 | 20.4 | 5 |
| 5 | CE35 | 0.23 | 10 | 0.5 | 5 | 2.1 | 23.7 | 19.9 | 5 |
| 6 | B60A | 0.215 | 10 | — | — | 1.2 | 23.5 | 16.9 | 5 |
| 7 | B60A | 0.185 | — | 0.5 | 5 | 2.4 | 26.9 | 13.7 | 5 |
| 8 | ADH3146 | 0.20 | 10 | 0.5 | 5 | 1.9 | 21.7 | 19.8 | 5 |
| 9 | E357 | 0.195 | 10 | 0.5 | 2.5 | 1.3 | 19.8 | 21.4 | 5 |
| 10 | E357 | 0.195 | 10 | 0.5 | 5 | 1.9 | 23.8 | 20.2 | 5 |
| 11 | E357 | 0.195 | 10 | 0.5 | 7.5 | 1.7 | 19.9 | 18.0 | 4 |
| 12 | E357 | 0.195 | 10 | 0.5 | 10 | 1.7 | 23.1 | 23.1 | 3 |
| 13 | E357 | 0.195 | — | 0.5 | 5 | 1.9 | 21.7 | 16.7 | 5 |
| 14 | E357 | 0.195 | — | 0.75 | 5 | 2.6 | 19.0 | 16.6 | 4 |

TABLE 3-continued

| Example | Polymer Latex | W/(C + SiF) | Silica fume % of binder | Fibre weight % | Fibre Length mm | Transverse Impact KJm$^{-2}$ | Transverse Flexural Strength MPa Dry | 7 day Immersion | Processability |
|---|---|---|---|---|---|---|---|---|---|
| 15 | E357 | 0.205 | — | 1.0 | 5 | 2.8 | 23.6 | 16.0 | 3 |

For all samples 4 to 15 P/(C + SiF) = 0.125
A/(C + SiF) = 1.5
P/(C + SiF) = Solid polymer latex to (cement + silica fume) ratio
A:(C + SiF) = Aggregate:(cement + silica fume) ratio
W/(C + SiF) = Water to (cement + silica fume) ratio
Immersion = Immersion in water
Processability Ratings
1. Unprocessable
2. Poor
3. Average
4. Good
5. Very good

TABLE 4

| Example | Polymer Latex | P/(C + SiF) | A:(C + SiF) | W/(C + SiF) | Fibre Weight % 5 mm Length |
|---|---|---|---|---|---|
| 16 | E357 | 0.125 | 3:2 | 0.195 | 0.5 |
| 17 | E357 | 0.125 | 3:2 | 0.205 | 0.5 |

| Flexural Strength MPa | | | | | | Impact Strength KJm$^{-2}$ | | |
|---|---|---|---|---|---|---|---|---|
| Dry | | 1 day Immersion | | 7 day | | | | |
| Trans | Para | Trans | para | Trans | para | Trans | Para | Porosity % |
| 27.7 | 29.9 | 26.2 | 27.5 | 24.6 | 24.0 | 1.9 | 3.3 | 8 |
| 30.8 | 30.0 | 25.8 | 30.3 | 27.0 | 27.2 | 2.2 | 3.4 | 6 |

A:(C + SiF) = Aggregate:(cement + silica fume) ratio
P/(C + SiF) = Polymer to (cement + silica fume) ratio
W/(C + SiF) = Water to (cement + silica fume) ratio
Immersion = Immersion in water
Trans = Strength measured transversely to the extrusion direction.
Para = Strength measured parallel to the extrusion direction.

TABLE 5

| Example | W/(C + SiF) | Flexural Strength (day dry), MPa | | | | Impact Strength (day dry) KJm$^{-2}$ | |
|---|---|---|---|---|---|---|---|
| | | Trans (14) | Para (14) | Trans (28) | Para (28) | Trans (1) | Para (1) |
| 18 | 0.25 | 16.9 ± 1.5 | 21.7 ± 2.5 | 20.0 ± 1.8 | 23 ± 2.3 | 2.4 ± 0.4 | 3.9 ± 0.3 |
| 19 | 0.22 | 20.1 ± 1.7 | 21.7 ± 2.1 | 24.5 ± 0.9 | 28.0 ± 1.5 | 1.9 ± 0.3 | 3.1 ± 0.3 |

We claim:

1. A process for the production of concrete roofing products having an aesthetically pleasing surface finish and a thickness in section of not greater than 15 mm which process comprises forming an asbestos-free cementitious composition comprising (i) aggregate having a major proportion of particles having diameters greater than 150 microns, (ii) hydraulic cement, (iii) water and (iv) reinforcing fibres in an amount between 0.25% and 4% by weight of a total weight of said composition and said fibres being present in an amount sufficient to provide a reinforcing effect and impact strength in said roofing products, said cementitious composition being capable of being shaped by a roller and slipper method, and thereafter shaping said cementitious composition by said roller and slipper method to provide a shaped extrudate, dividing said extrudate to form sections and curing said sections to provide said roofing products having said aesthetically pleasing surface finish. wherein said reinforcing fibres have lengths of 0.5 mm to 20 mm.

2. A process as claimed in claim 1 wherein said composition additionally comprises a plasticizer or a superplasticizer.

3. A process as claimed in claim 2 further comprising curing said sections whereby said roofing products have transverse impact strength values of at least 1.5 KJm$^{-2}$ and Modulus of Rupture values of at least 15 MPa.

4. A process as claimed in claim 1 wherein said percentage by weight of said reinforcing fibres to said total weight of said composited is from 0.25 to 1%.

5. A process as claimed in claim 1 wherein, said percentage by weight of said reinforcing fibres to said total weight of said composition is substantially 0.5%.

6. A process as claimed in claim 1 wherein said reinforcing fibres have lengths of from 4 mm to 8 mm.

7. A process as claimed in claim 6 wherein said length is substantially 6 mm.

8. A process as claimed in claim 1 wherein said reinforcing fibres are polypropylene fibres.

9. A process as claimed in claim 1 wherein said composition further comprises from 1 to 30% silica fume calculated as a percentage on a weight of cementitious material in said composition.

10. A process as claimed in claim 1 wherein a weight ratio of aggregate:cementitious material in said composition is from 1:1 to 4:1.

11. A process as claimed in claim 1 wherein a weight ratio of aggregate:cementitious material in said composition is substantially 3:2.

12. A process as claimed in claim 1 wherein said aggregate comprises a weight ratio of coarse slate to fine sand of from 1:1 to 2:1.

13. A process as claimed in claim 1 wherein said aggregate comprises a weight ratio of course slate to fine sand of substantially 3:2.

14. A process as claimed in claim 1 wherein a weight ratio of water:cementitious material in said composition is from 0.15:1 to 0.40:1.

15. A process as claimed in claim 1 wherein said sections are cured using an autoclave.

16. A process as claimed in claim 1 further comprising curing said sections whereby said roofing products have transverse impact strength values of at least 1.5 KJm$^{-2}$.

17. A process as claimed in claim 1 wherein said shaping is conducted to form roofing tiles.

18. A process as claimed in claim 17 wherein said shaping is carried out so that said roofing tiles have thicknesses in section of not greater than 12 mm.

19. A process for the production of concrete roofing products having an aesthetically pleasing surface finish and a thickness in section of not greater than 15 mm which process comprises forming an asbestos-free cementitious composition comprising (i) aggregate having a major proportion of particles having diameters greater than 150 microns, (ii) hydraulic cement, (iii) water and (iv) reinforcing fibres in weight percent to a total weight of said composition of 0.25% to 4%, said cementitious composition being capable of being shaped by a roller and slipper method, and thereafter shaping said cementitious composition by said roller and slipper method to provide a shaped extrudate, dividing said extrudate to form sections and curing said sections to provide said roofing products having said aesthetically pleasing surface finish, wherein said reinforcing fibres have lengths of 2.0 mm to 20 mm.

20. A process for the production of concrete roofing products having an aesthetically pleasing surface finish and a thickness in section of not greater than 15 mm which process comprises forming an asbestos-free cementitious composition comprising (i) aggregate having a major proportion of particles having diameters greater than 150 microns, (ii) hydraulic cement, (iii) water, (iv) reinforcing fibres in an amount between 0.25% and 4% by weight of a total weight of said composition and said fibres being present in an amount sufficient to provide a reinforcing effect and impact strength in said roofing product, and (v) a polymer latex in weight ratio of polymer, calculated as dry weight, to cementitious material within a range of 5:100 to 50:100, said cementitious composition being capable of being shaped by a roller and slipper method, and thereafter shaping said cementitious composition by said roller and slipper method to provide a shaped extrudate, dividing said extrudate to form sections and curing said sections to provide said roofing products having said aesthetically pleasing surface finish, wherein said reinforcing fibres have lengths of 0.5 mm to 20 mm.

21. A process as claimed in claim 20 wherein a weight ratio of water:cementitious material in said composition is from 0.12:1 to 0.25:1.

22. A process as claimed in claim 20 wherein said weight ratio of polymer calculated as dry weight to cementitious material is from 7:100 to 15:100.

23. A process as claimed in claim 20 wherein said weight ratio of polymer calculated as dry weight to cementitious material is substantially 12.5:100.

24. A process as claimed in claim 20 further comprising curing said sections wherein said roofing products have transverse impact strength values of at least 1.6 KJm$^{-2}$ and Modulus of Rupture values of at least 20 MPa.

25. A process as claimed in claim 24 wherein said shaping is conducted to form roofing slates.

26. A process as claimed in claim 25 wherein said shaping is carried out so that said roofing slates have thicknesses in section of not greater than 6 mm.

27. A process for the production of concrete roofing products having an aesthetically pleasing surface finish and a thickness in section of not greater than 15 mm which process comprises forming an asbestos-free cementitious composition comprising (i) aggregate having a major proportion of particles having diameters greater than 150 microns, (ii) hydraulic cement, (iii) water, (iv) reinforcing fibres in weight percent to a total weight of said composition of 0.25 to 4%, and (v) a polymer latex in weight ratio of polymer, calculated as dry weight, to cementitious material within a range of 5:100 to 50:100, said cementitious composition being capable of being shaped by a roller and slipper method, and thereafter shaping said cementitious composition by said roller and slipper method to provide a shaped extrudate, dividing said extrudate to form sections and curing said sections to provide said roofing products having said aesthetically pleasing surface finish, wherein said reinforcing fibres have lengths of 2.0 mm to 20 mm.

* * * * *